US005949659A

United States Patent [19]
Lesche

[11] Patent Number: 5,949,659
[45] Date of Patent: Sep. 7, 1999

[54] GALVANICALLY ISOLATED TRANSMISSION OF POWER AND INFORMATION TO AN ELECTRONIC UNIT

[75] Inventor: Wolfgang Lesche, Berlin, Germany

[73] Assignee: Siemens AG, Munich, Germany

[21] Appl. No.: 08/973,388

[22] PCT Filed: May 24, 1996

[86] PCT No.: PCT/DE96/00950

§ 371 Date: Mar. 20, 1998

§ 102(e) Date: Mar. 20, 1998

[87] PCT Pub. No.: WO96/38829

PCT Pub. Date: Dec. 5, 1996

[30] Foreign Application Priority Data

May 2, 1995 [DE] Germany ............................ 195 20 940

[51] Int. Cl.⁶ .................................................. H02M 3/335
[52] U.S. Cl. ................................................ 363/16; 363/21
[58] Field of Search ............................... 363/15, 16, 20, 363/21

[56] References Cited

U.S. PATENT DOCUMENTS

| | | | |
|---|---|---|---|
| 4,402,039 | 8/1983 | Jirka | 363/21 |
| 4,761,812 | 8/1988 | Hollis et al. | 363/21 |
| 4,803,722 | 2/1989 | Schreiber | 363/20 |
| 5,438,496 | 8/1995 | Meur et al. | 363/16 |
| 5,798,913 | 8/1998 | Tiesinger et al. | 363/21 |
| 5,845,190 | 12/1998 | Bushue et al. | 363/21 |

FOREIGN PATENT DOCUMENTS

| | | | |
|---|---|---|---|
| 0 538 624 A1 | 4/1993 | European Pat. Off. | G08C 23/00 |
| 0 616 924 A1 | 9/1994 | European Pat. Off. | B60R 16/02 |
| 41 12 855 A1 | 10/1992 | Germany | H02M 3/335 |
| 44 07 529 C1 | 6/1995 | Germany | H02M 3/28 |
| 44 14 676 C1 | 6/1995 | Germany | H04B 3/50 |
| 679 196 A5 | 12/1991 | Switzerland | H04L 25/02 |

OTHER PUBLICATIONS

Buch von W. Hirschmann and A. Hauenstein "Schaltnetzteile", Dec. 1990, pp. 40 through 64.
Buch von O. Kilgenstein "Schaltnetzteile in der Praxis", Dec. 1988, pp. 9 through 13.
Databook "Motorola High Speed CMOS Logic Data" Series D, Dec. 1989.
W. Jitschin, DC–DC–Umsetzer, In: Elektor, Jul./Aug. 1985, pp. 7–62.

*Primary Examiner*—Jeffrey Sterrett
*Attorney, Agent, or Firm*—Kenyon & Kenyon

[57] ABSTRACT

An arrangement for the galvanically isolated transmission of auxiliary power (direct voltage) and information to an electronic unit having a switched-mode power supply, comprising a transformer whereby the primary winding can be connected to a direct voltage by means of a switching arrangement that can be actuated by a control circuit. To enable a comparatively cost-effective manufacturing of such an arrangement, the control circuit in accordance with the present invention actuates the switching arrangement in accordance with information (primary information) to be transmitted to the secondary side of the switched-mode power supply. An evaluation circuit that detects the primary information is connected to a circuit point between the secondary winding of the transformer and the usual rectifier element. A transmitter is provided on the secondary side of the switched-mode power supply and switches the load on the secondary winding to low impedance in accordance with information (secondary information) to be transmitted to the primary side of the switched-mode power supply when the evaluation module that detects the secondary information is connected to one end of the primary winding.

8 Claims, 5 Drawing Sheets

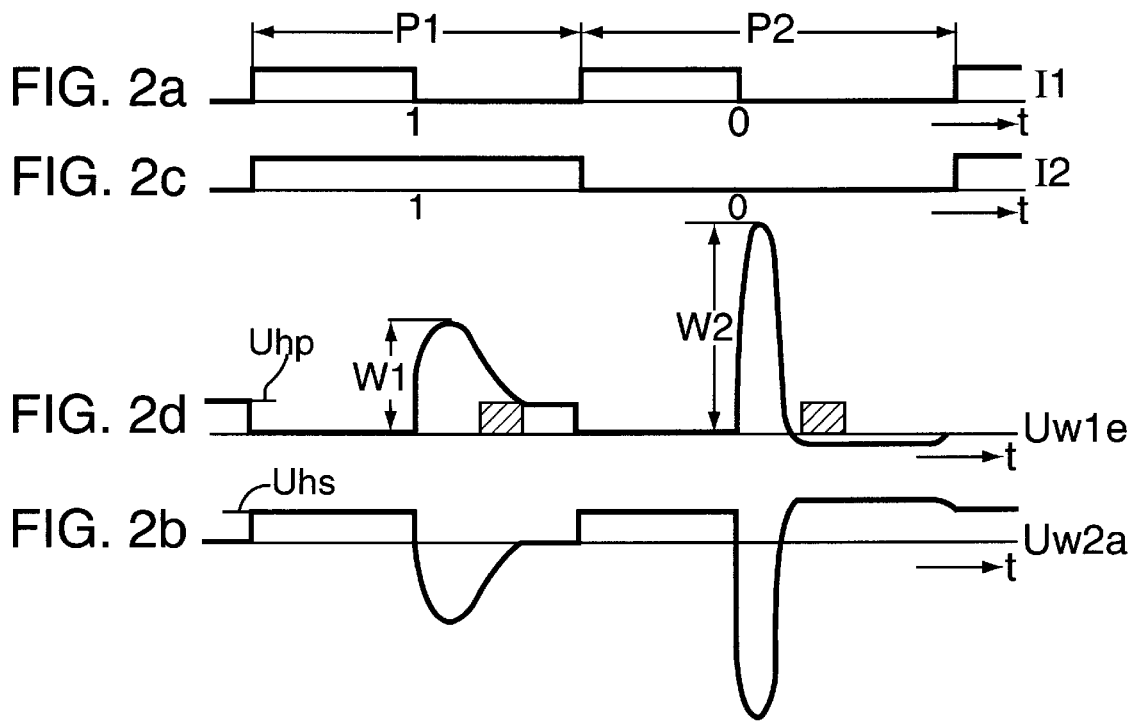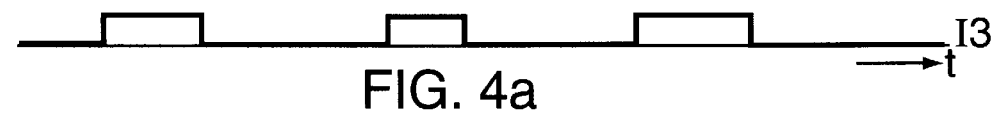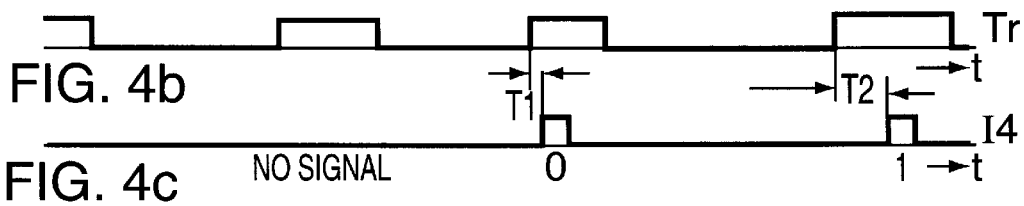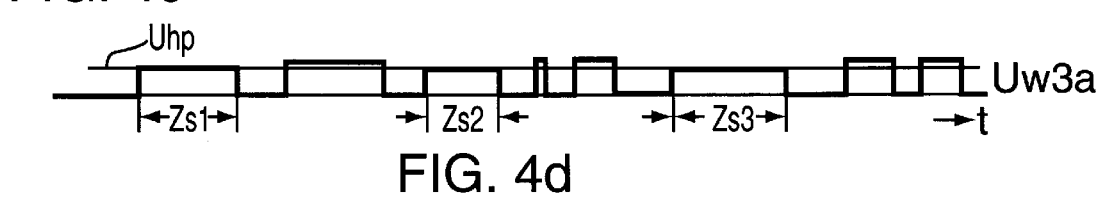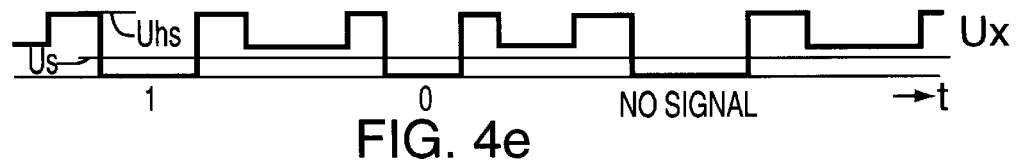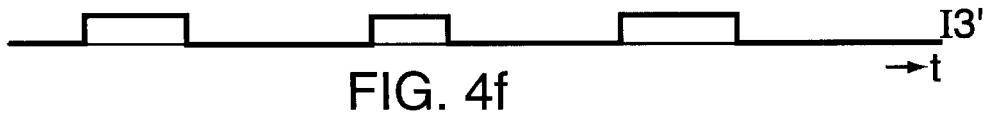

GALVANICALLY ISOLATED TRANSMISSION OF POWER AND INFORMATION TO AN ELECTRONIC UNIT

FIELD OF THE INVENTION

The present invention relates to the problem of supplying an electronic unit with auxiliary power in the form of direct voltage and information while ensuring galvanic isolation.

BACKGROUND OF THE INVENTION

The problem can evidently be solved by using a switched-mode power supply of the type known as a single-ended and push-pull converter. Such switched-mode power supplies are described in the book by O. Kilgenstein, *Schaltnetzteile in der Praxis* [Switched-Mode Power Supplies in Practical Use] (1988), pages 9 to 13. The basic circuitry of various switched-mode power supplies is also described in W. Hirschmann and A Hauenstein, *Schaltnetzteile* [Switched-Mode Power Supplies] (1990) pages 40 to 64. Also recommended for the galvanically isolated transmission of information to electronic units is the use of transformers or optical couplers.

SUMMARY OF THE INVENTION

An object of the present invention is a particularly simple and cost-effective arrangement for the galvanically isolated transmission of auxiliary power (direct voltage) and information to an electronic unit.

The present invention provides an arrangement for the galvanically isolated transmission of auxiliary power (direct voltage) and information to an electronic unit with a switched-mode power supply including a transformer with at least one primary and one secondary winding. The primary winding of the transformer can be connected to a direct voltage by means of a switching arrangement that can be actuated by a control circuit, while the secondary winding is connected to one output terminal by way of a rectifier element and, on the other hand, directly with the other output terminal of the switched-mode power supply. The control circuit in accordance with the present invention is designed such that it actuates the switching arrangement in accordance with information (primary information) to be transmitted to the secondary side of the switched-mode power supply, and such that an evaluation circuit that detects the primary information is connected to a circuit point between the secondary winding and the rectifier element.

The essential advantage of the arrangement of the present invention is that no additional transformer and no additional optical coupler are needed to transmit the primary information to the electronic unit because the primary information derives from primary-side modulation of the auxiliary-power supply to the switched-mode power supply. The arrangement of the present invention can accordingly do without a transformer or optical coupler to transmit the information to the electronic unit.

It is often necessary for information to flow not only in one direction, from the primary side of the switched-mode power supply to the electronic unit, but also in the opposite direction, from the electronic unit to the primary side. This demand is satisfied to advantage by an embodiment of the arrangement in accordance with the present invention, whereby a transmitter is provided on the secondary side of the switched-mode power supply and switches the load on the secondary winding to low impedance in accordance with information (secondary information) to be transmitted to the primary side of the switched-mode power supply, when the switching arrangement is open, and whereby an evaluation module that detects the secondary information is connected to one end of the primary winding.

Although transmitting information from the secondary side of a switched-mode power supply to the primary side is indeed known from European Patent 0 538 624 A1, the voltage derived from a charging capacitor is forwarded to the secondary winding of the transformer in the switched-mode power supply by an electronic switch actuated for that purpose in the arrangement for transmitting information known from that publication.

It has proven to be advantageous, when the converter in the arrangement of the present invention is single-ended, for the transmitter to include a series comprising first a load impedance and second the switching section of an electronic switch, controlled in accordance with the secondary information to be transmitted, and for the series to constitute, in conjunction with an extra diode poled oppositely to the rectifier element, a series arrangement directly paralleling the secondary winding. The flyback voltage from the transformer in the switched-mode power supply is exploited to advantage in this embodiment to transmit information from the secondary to the primary side.

When the switched-mode power supply is a single-ended converter, the primary-side switching arrangement in the arrangement of the present invention can be constructed very simply in the form of an electronic switching element.

The evaluation circuit and evaluation module that complement the switched-mode power supply in the arrangement for the galvanically isolated transmission of information of the present invention can also be realized inexpensively if the evaluation circuit and evaluation module each consist to advantage of a comparator element that emits a digital signal with one sign when one incoming-voltage value is exceeded, and a digital signal of the other sign when another (lower) incoming-voltage level is not attained.

To achieve galvanically isolated transmission of the auxiliary power with particular efficiency by means of the arrangement of the present invention, the converter in one advantageous embodiment of the arrangement of the present invention is a push-pull converter and the switching arrangement comprises two buffers that act like electronic switches, whereby one buffer has an inverting input terminal or output terminal; both buffers are connected at the input side to a control output terminal of the control circuit, the one buffer is connected at the output side to one end of the primary winding, and the other buffer, the one with the inverting input terminal, is connected at the output side to the other end of the primary winding, and the buffers' operating-voltage connection is connected to direct voltage. This embodiment of the arrangement of the present invention, with a push-pull converter as the switched-mode power supply, allows information to be transmitted to the electronic unit from only the primary side of the push-pull converter.

The present invention can also be directly employed with other known push-pull converters.

To allow the galvanically isolated transmission of information in the other direction, from the electronic unit to the primary side as well, when the switched-mode power supply is employed as a push-pull converter, the control circuit in the arrangement of the present invention can to advantage feature an additional input terminal emitting a tri-state signal that interrupts the flow of current through the primary winding, and a transmitter can be provided on the secondary side of the switched-mode power supply to switch the load of the secondary winding to low impedance in accordance with the information (secondary information) to be transmitted to the primary side of the switched-mode power supply when the flow of current through the primary winding is interrupted, and an evaluation module that detects the secondary information can be connected to one end of the primary winding.

It has been proven of advantage to this embodiment of the arrangement of the present invention for the transmitter to include an electronic switching mechanism with a switching section paralleling the rectifier element and for the evaluation circuit to have a comparator with a prescribed threshold.

With respect to the design of the evaluation module in this specific embodiment of the arrangement of the present invention, it is considered of advantage for the evaluation module to include a logic circuit, the input side of which is supplied with the voltage from one end of the primary winding, with the signal from the control output terminal of the control circuit, and with the tri-state signal. The information emitted by the electronic unit can accordingly be recovered on the primary side by a simple procedure.

BRIEF DESCRIPTION OF THE DRAWINGS

FIG. 2 shows several graphs over time illustrating how the embodiment illustrated in FIG. 1 works.

FIG. 4 shows several graphs over time illustrating how the embodiment illustrated in FIG. 3 works.

DETAILED DESCRIPTION

Figure 1:
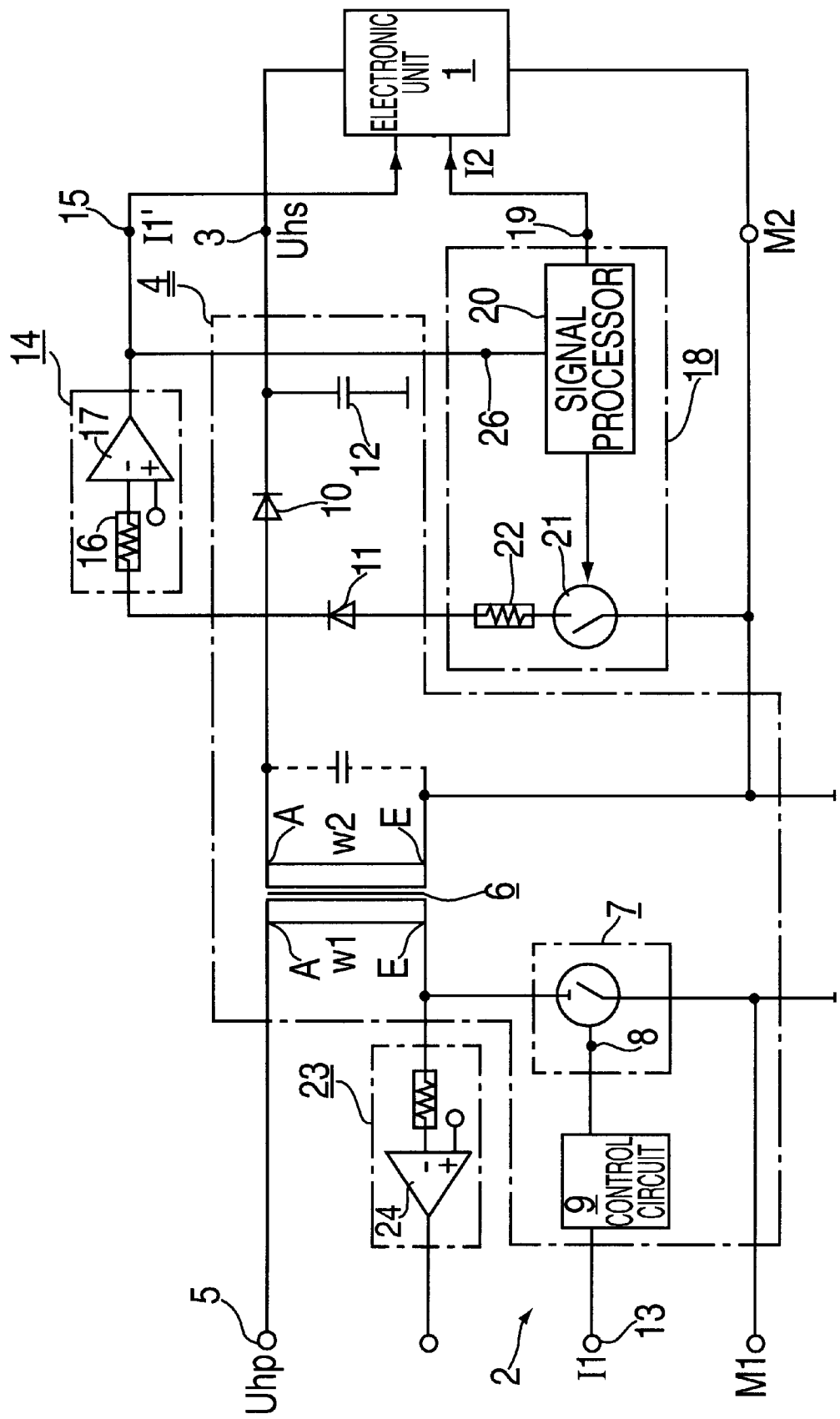
FIG. 1 illustrates one embodiment of the arrangement of the present invention with a single-ended converter.

The embodiment of an arrangement of the present invention schematically illustrated in FIG. 1 has an electronic unit 1, a test transducer for example (or a measuring transducer), galvanically isolated from a primary side 2 and to be supplied both with auxiliary power in the form of a direct voltage and with information. Electronic unit 1 is connected, in order to be supplied with auxiliary power, to one output terminal 3 of a switched-mode power supply 4 in the form of a single-ended converter, and a direct voltage Uhs is generated at output terminal 3.

To obtain direct voltage Uhs from output terminal 3, switched-mode power supply 4 is connected to a direct voltage Uhp on the primary side by an input terminal 5. The beginning A of a primary winding w1 in a transformer 6 is connected to input terminal 5. The end E of primary winding w1 is connected to mass M1 by way of the switching section of an electronic switching arrangement 7. Switching arrangement 7, which consists in the present case of an electronic switching element, in the form of a transistor for example, is connected by way of its control input terminal 8 to a control circuit 9. Switching arrangement 7 is accordingly actuated by control circuit 9 such that current flows at every actuation through the primary winding w1 of transformer 6. The actuation-dictated flow of current through the primary winding w1 of transformer 6 causes current to flow through the secondary winding w2 of transformer 6, the beginning A of which is connected by way of a rectifier element 10 to the output terminal 3 of switched-mode power supply 4. The end E of secondary winding w2 is connected to mass M2. Connected to the beginning A of secondary winding w2 is a diode 11, conventionally poled oppositely to rectifier element 10. A capacitor 12 is also conventionally connected to mass on the side of rectifier element 10 facing away from secondary winding w2.

The control circuit 9 in the arrangement illustrated in FIG. 1 is not designed as conventional for switched-mode power supplies, but to actuate switching arrangement 7 in accordance with primary information I1 available at an input terminal 13. Primary information I1 can for example behave over time as represented in the graph a in FIG. 2. The level "1" for the primary information in this graph is expressed by a signal length P1 and the level "0" by a signal length P2. Switching arrangement 7 will accordingly remain closed longer when primary information I1 is at level "1" than when primary information I1 is at level "0".

Such actuation of switching arrangement 7 results in the voltage Uw2a at the beginning A of secondary winding w2 illustrated in graph b in FIG. 2. The negative segments of voltage Uw2a are due to the flyback voltage in transformer 6. They are exploited to obtain information I1' corresponding to the information I1 transmitted on the primary side, from a terminal 15, by means of an evaluation circuit 14. A comparator element 17 is connected for this purpose to the beginning A of secondary winding w2 by way of a resistor 16. Comparator element 17 emits a "0" signal when the voltage is below a prescribed lower threshold and a "1" signal when it exceeds a prescribed higher threshold. The received signal I1' will accordingly correspond to the transmitted primary information I1. Comparator element 17 can be a Motorola HC04 buffer (cf. "Motorola High-Speed CMOS Logic Data, Series d, 1989). Direct voltage Uhs can accordingly be processed ready to supply auxiliary power to electronic unit 1 and primary information I1 provided to the unit in the form of signal I1' without an additional transformer or optical coupler.

To allow the transmission of secondary information I2 to the primary side of the arrangement illustrated in FIG. 1 by electronic unit 1, a transmitter 18 on the secondary side of switched-mode power supply 4 is connected by its input terminal 19 to electronic unit 1 for the purpose of receiving the secondary information I2 to be transmitted. Transmitter 18 includes on its input side a signal processor 20 in the form electronic switch 21 which, with its switching section and a resistor 22, forms a series circuit. Since this series circuit of switch 21 is in series with diode 11, secondary winding w2 will be switched to low impedance when electronic switch 21 is actuated by signal processor 20.

If secondary information I2 exhibits a time characteristic as shown in graph c of FIG. 2, secondary winding w2 will be switched to low impedance as long as the signal representing secondary information I2 is "1", which will cause the flyback voltage to assume a comparatively low level W1 as illustrated in graph d in FIG. 2, which shows the voltage Uw1e at the end E of the primary winding w1 in transformer 6 over time. Secondary winding w2 will remain at high impedance as long as secondary information I2 is at level "0", leading to a flyback pulse with a considerably higher level W2, as will also be evident from the graph d in FIG. 2. It accordingly becomes possible on the primary side to obtain information I2 in terms of its different levels. This can be done with an evaluation module 23 comprising a protective resistor in series with a comparator component 24. Comparator component 24 is similar in design to comparator element 17 and emits a "0" pulse when the incoming voltage is higher than 3 V and a "1" pulse when the incoming voltage is less than 2 V. The block hatched from the bottom left to the top right in graph d in FIG. 2 represents a "0" pulse and the block hatched from the top left to the bottom right a signal of level "1". It will be evident from the graph d in FIG. 2 that information I2' corresponding to the transmitted secondary information I2 can be obtained on the primary side.

Requisite to the mode of operating the arrangement illustrated in FIG. 1 is that the secondary side be synchronized with the primary side. This is automatically ensured in the arrangement illustrated in FIG. 1 in that the output terminal of evaluation circuit 14 is connected to the synchronization input terminal 26 of the secondary-side signal processor 20.

Figure 3:
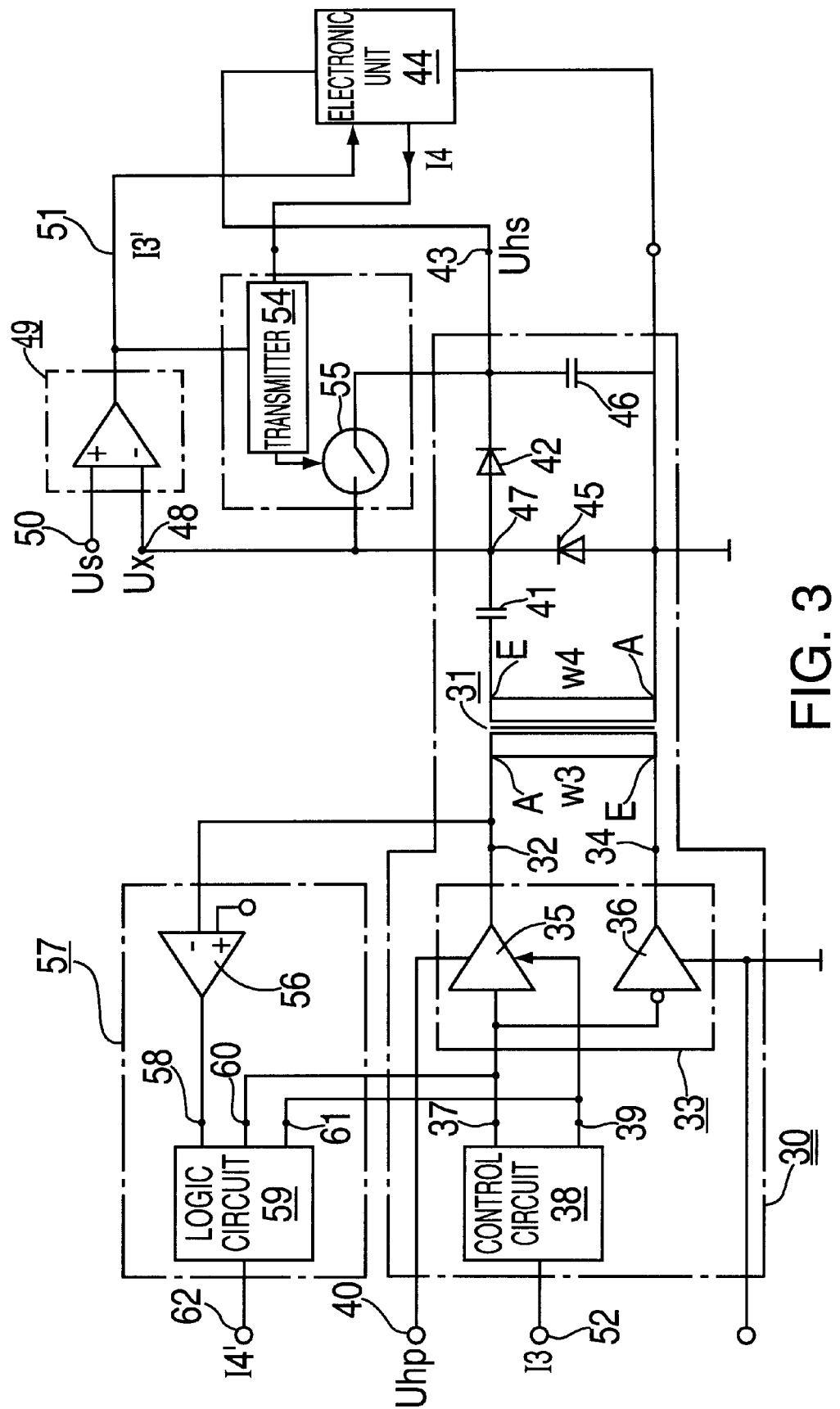
FIG. 3 illustrates another embodiment of the arrangement of the present invention with a switched-mode power supply in the form of a push-pull converter.
Figure 5A:
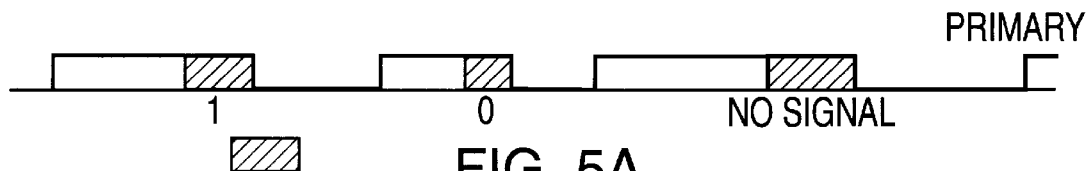
FIG. 5 shows different ways of modulating primary information that are particularly appropriate for transmission in an arrangement with a single-ended converter.
Figure 5B:
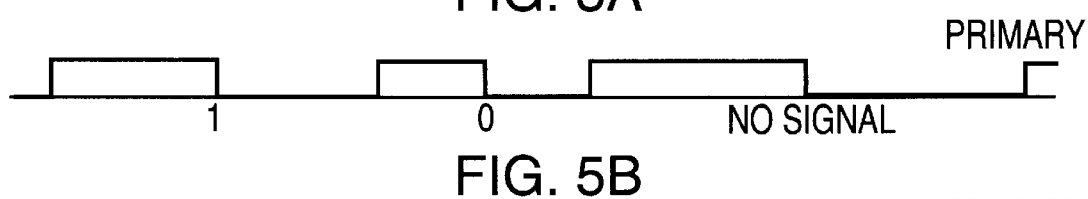
Figure 5C:
Figure 5D:
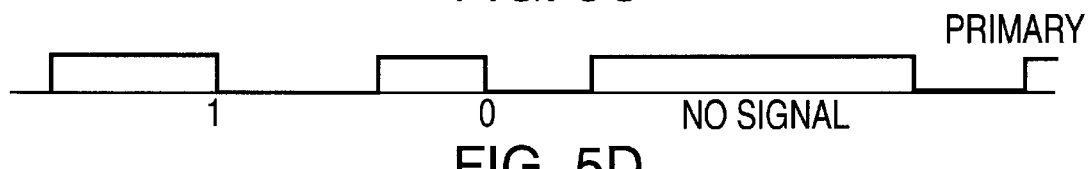

The embodiment of the arrangement of the present invention illustrated in FIG. 3 employs a switched-mode power supply 30 in the form of a push-pull converter. The push-pull converter includes a transformer 31 connected at one end A of its primary winding w3 to one output terminal 32 of a switching arrangement 33. The end E of primary winding w3 is connected to another output terminal 34 of switching arrangement 33.

Switching arrangement 33 includes two buffers 35 and 36. Buffer 36 has an inverting input terminal. The input terminals of buffers 35 and 36 are connected to a control output terminal 37 of a control circuit 38. Buffers 35 and 36 act as electronic switches and, due to their common input-side connection to control circuit 38 and to the inverting input terminal of buffer 36, can be actuated such that only one can be provided with direct voltage at a time. Buffers 35 and 36 can be in the form of the module HC241A described in the Motorola "High-Speed CMOS Logic Data, Series" D (1989). The control circuit 38 in the arrangement illustrated in FIG. 3 has another, "tri-state" output terminal 39, by way of which an enabling signal in the form of a tri-state signal can be forwarded to buffer 35. Buffers 35 and 36 are powered by direct voltage Uhp, which is available at the arrangement's input terminal 40. The connection between second buffer 36 and direct voltage Uhp is, for reasons of simplicity and clarity, not illustrated.

The secondary winding w4 of transformer 31 is connected by way of a capacitor 41 and a rectifier element 42 to an output terminal 43 of switched-mode power supply 30, where direct voltage Uhs for operating a downstream electronic unit 44 can be obtained. The circuitry of the secondary winding w4 in transformer 31 is complemented with a diode 45 and a capacitor 46, resulting in twice the voltage.

One input terminal 48 of an evaluation circuit 49 is connected to a switching point 47 between capacitor 41 and rectifier element 42. The evaluation circuit 49 in the illustrated embodiment is an operations amplifier in the form of a comparator. Another input terminal 50 of evaluation circuit 49 is supplied with a threshold voltage Us. When the voltage at switching point 47 exceeds threshold voltage Us, evaluation circuit 49 emits a signal I3' from an output terminal 51 that corresponds as will be specified hereinafter to primary information I3 at one input terminal 52 of control circuit 38.

When information in accordance with the graph a in FIG. 4 is to be employed as the primary information I3 to be transmitted, a voltage Uw3a will, as will be evident from the graph d in FIG. 4, occur at the beginning A of the primary winding w3 of transformer 31. Voltage Uw3a will be of the same level as direct voltage Uhp during intervals Zs1 to Zs3. Intervals Zs1 to Zs3 accordingly correspond to the intervals during which the pulses of primary information I3 exhibit level "1". Due to the double voltage generated on the secondary side by capacitors 41 and 46, a voltage Ux will, as will be evident from the graph e in FIG. 4, occur at switching point 47. Voltage Ux will to some extent assume a relatively high level, corresponding to the level of direct voltage Uhs, outside intervals Zs1 to Zs3. During intervals Zs1 to Zs3, on the other hand, the level of voltage Ux will remain below threshold voltage Us, leading to the emission of "1" pulses at output terminal 51 of evaluation circuit 49. The resulting information I3' corresponds to primary information I3.

To allow the transmission of information I4 from electronic unit 44 to the primary side as well, a tri-state signal Tr is generated at the tri-state output terminal 39 of control circuit 38. Tri-state signal Tr will always occur when primary information I3 exhibits level "0" and switching arrangement 33 is open. Due to the flyback voltage, tri-state signal Tr will, as long as there is voltage Uw3a at the beginning of primary winding w3, act as a voltage above the level of direct voltage Uhp, as will be evident from the graph d in FIG. 4. The voltage Ux at switching point 47 will consequently always drop in the presence of the tri-state signals. It will, however, remain above threshold voltage Us (cf. graph e). Evaluation circuit 49 will then emit a corresponding synchronization signal to a transmitter 54. Transmitter 54 will, in turn, emit a signal delayed a prescribed interval T1 in relation to the tri-state signal when the secondary information I4 to be transmitted is at level "0" and another signal displaced a different interval T2 when information I4 is at level "1", always actuating an electronic switch 55 during the presence of the signals in accordance with the particular secondary information I4 to be transmitted, rectifier element 42 being short-circuited. The voltage Uw3a at the beginning of primary winding w3 will accordingly drop to the level "0" in the presence of the signals corresponding to I4 as will be evident from the graph d in FIG. 4. Since this voltage is forwarded to an input terminal 60 of a logic circuit 59 with the control signal emitted by control circuit 38 also available at its other input terminal 58 and the tri-state signal available at its additional input terminal 61, by way of a comparator 56, similar to the comparator 24 illustrated in FIG. 1, in an evaluation circuit, received information I4' corresponding to secondary information I4 will appear at logic circuit 59.

Thus, with the arrangement in accordance with FIG. 3, both the galvanically isolated transmission of auxiliary power and the galvanically isolated transmission of information in both directions is possible without additional transformers and without an additional optical coupler.

As will be evident from the graph a in FIG. 5, it is possible as hereintofore specified with reference to FIGS. 1 and 3 to use two signal lengths as primary information in order to transmit primary information at signal states "0" and "1". It is also possible to transmit "no signal" with a signal of different length. If a close-loop-controlled flyback converter is employed, a control range on the order of ±20% is possible as represented by the hatching in graph a.

With a single-ended flow converter (or a forward converter), it is possible to employ a similarly modulated direct-voltage signal as primary information, as will be evident from graph b in FIG. 5. It is also possible to use two or three constant turn-on durations in the particular switching arrangement in the arrangement of the present invention to transmit "0", "1", or "no signal" signals to the secondary side as illustrated by graph c in FIG. 5. Graph d in FIG. 5 illustrates how combinations of the signals illustrated in graphs b and c can be employed to modulate the primary information to be transmitted.

The primary information to be transmitted can also be modulated in different ways when a push-pull converter is employed as a switched-mode power supply in the arrangement of the present invention. Graph a in FIG. 6, for instance, shows how processing can be carried out with a ternary signal of three fixed signal durations in order to transmit signals "1", "0", and "no signal". The pulses representing the secondary information to be transmitted in the opposite direction will occur whenever a tri-state signal has eliminated current from the transformer's primary winding. The sloping-hatched blocks characterize the situation of the secondary-information pulse over time.

As illustrated in graph c in FIG. 5, it is also possible when using a push-pull converter to modulate the direct voltage on the primary side with two or three fixed turn-on durations, resulting in the relationships illustrated in graph b. Here, as well, the secondary-information pulses are transmitted by way of the hatched blocks in the presence of a tri-state signal.

Figure 6A:
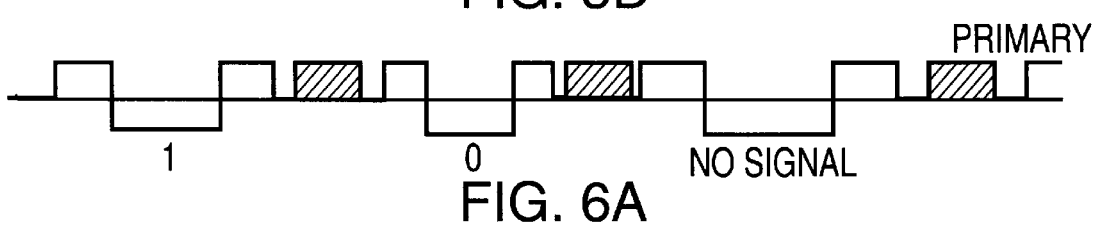
FIG. 6 shows different ways of modulating primary information that are particularly appropriate for transmission in an arrangement with a push-pull converter.
Figure 6B:
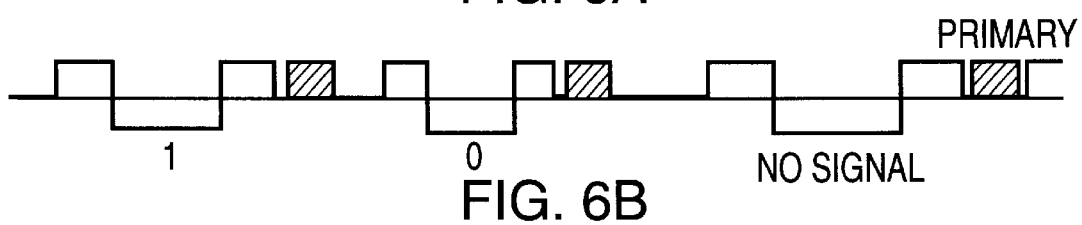
Figure 6C:
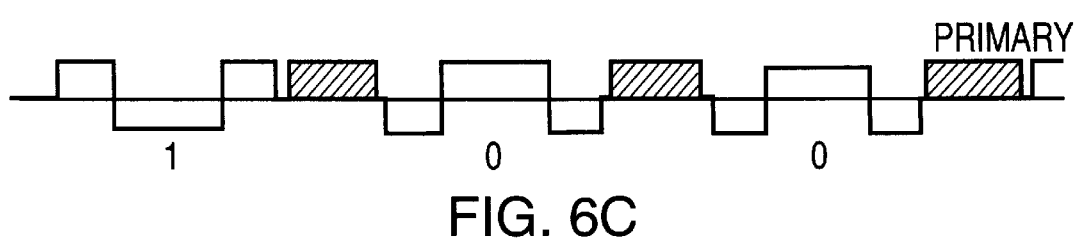
Figure 7A:
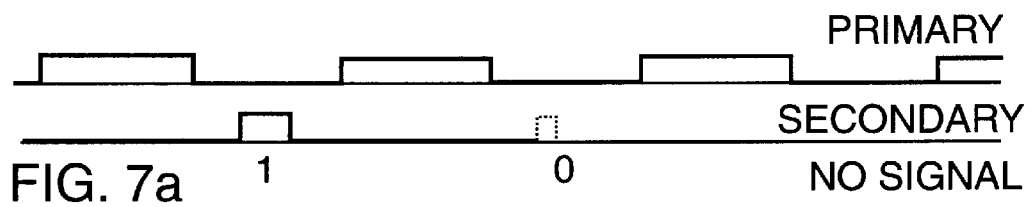
FIG. 7 shows graphs over time illustrating possible forms of primary and secondary information particularly appropriate for an arrangement with a single-ended converter.
Figure 7B:
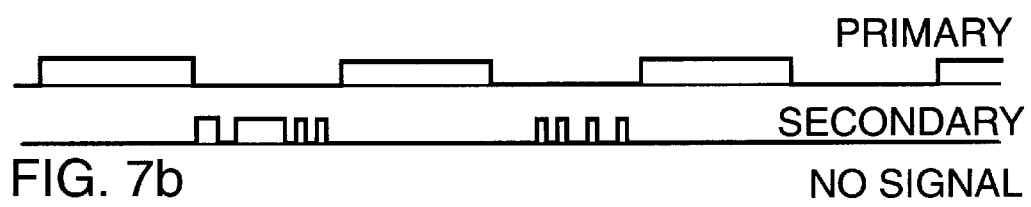
Figure 7C:
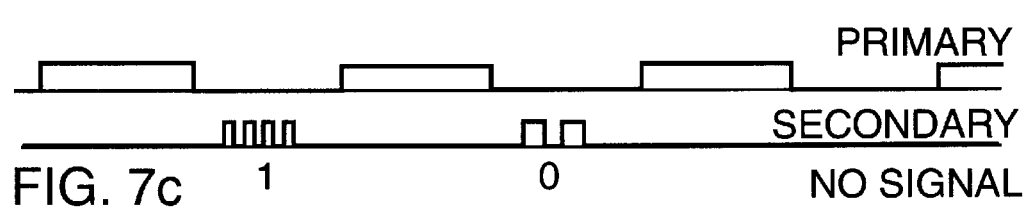
Figure 7D:
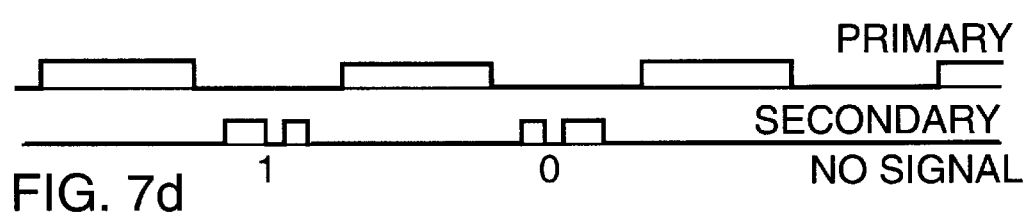
Figure 8A:
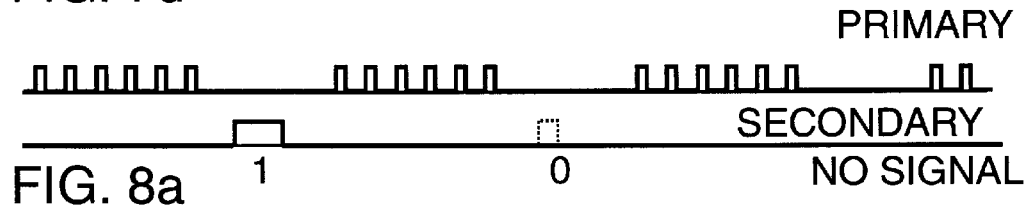
FIG. 8 shows graphs over time illustrating possible forms of primary and secondary information particularly appropriate for an arrangement with a push-pull converter.
Figure 8B:
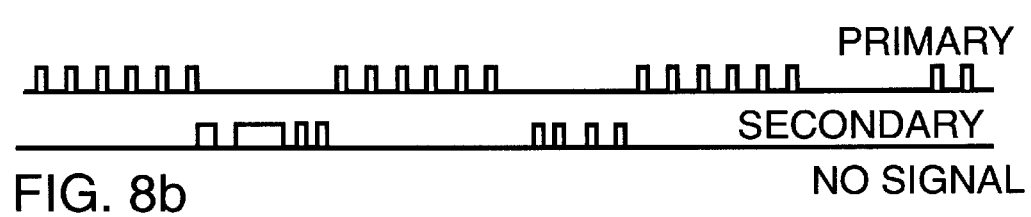
Figure 8C:
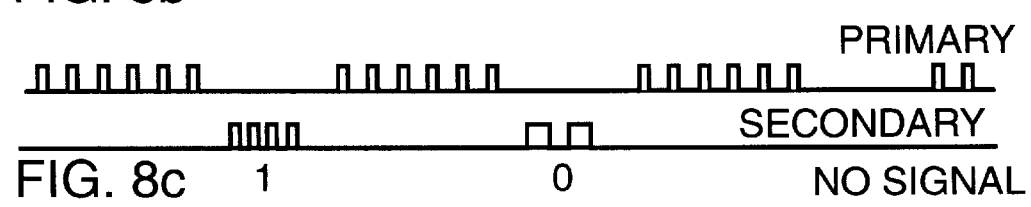
Figure 8D:
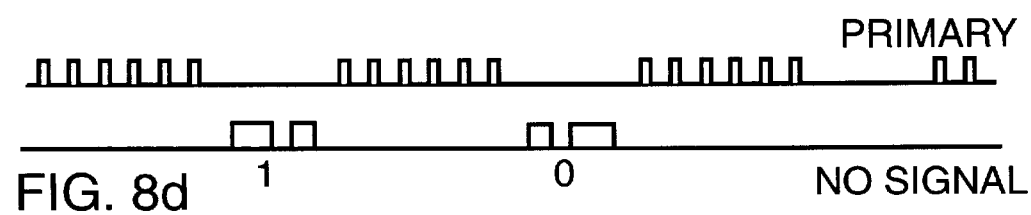

It is also possible, as will be evident from the graph c in FIG. 6, to operate with a constant turn-on duration for the "0" signal state of the primary information and to change phase in order to transmit a "1" signal.

Other combinations are also possible.

Graphs a, b, c, and d in FIG. 7 illustrate how, when there is no current in the primary winding of the transformer in the arrangement of the present invention illustrated in FIGS. 1 and 3, not only secondary information can be transmitted with one form of modulation as specified with reference to FIGS. 1 and 3 in conjunction with FIGS. 2 and 4, but telegraph segments, in the form of a byte for example, can also be transmitted during the no-current phases. The conventional start and stop bytes can be eliminated because a fixed synchronization structure is provided by the primary-information pulses.

It is also possible, as illustrated by graph c in FIG. 7, to employ frequency shift keying to transmit "0", "1", or "no signal" secondary-information signals.

As will be evident from the graph d in FIG. 7, it is also possible to employ variations in frequency or phase sequence to transmit secondary information with the arrangement of the present invention.

As will be evident from the graphs a, b, c, and d in FIG. 8, the primary information can also be transmitted in the form of pulse packets. When there is no current flowing through the primary winding, the secondary information can also be transmitted as illustrated in graphs b through d in FIG. 8.

What is claimed is:

1. An arrangement for a galvanically isolated transmission of power and information to an electronic unit, comprising:
    a switched-mode power supply, the switched-mode power supply being one of a forward converter and a flow converter, and including:
        a rectifier element,
        a transformer generating a flyback voltage and including a primary winding and a secondary winding, wherein the secondary winding is connected to a first output terminal of the switched-mode power supply via the rectifier element, and to a second output terminal of the switched-mode power supply, and
        a controllable switching device having a control circuit which is connected to an information input terminal of the arrangement, the information input terminal receiving primary information to be transmitted to a secondary side of the switched-mode power supply, the control circuit actuating the controllable switching device in accordance with the primary information,
        wherein the primary winding and the controllable switching device are arranged in a series circuit which is connected between first and second input terminals of the arrangement;
    an evaluation circuit which detects the primary information and which is coupled to a circuit point between the secondary winding and the rectifier element;
    a transmitter coupled to the secondary side of the switched-mode power supply, the transmitter transmitting secondary information from the secondary side to a primary side of the switched-mode power supply using the flyback voltage, the secondary information being transmitted outside of an energy transmission phase, the transmitter switching a load on the secondary winding to a low impedance in accordance with the secondary information to be transmitted to the primary side of the switched-mode power supply when the controllable switching device is open; and
    an evaluation module which detects the secondary information and which is coupled to an end of the primary winding.

2. The arrangement according to claim 1, wherein the controllable switching device includes an electronic switching element.

3. The arrangement according to claim 1, wherein:
    the control circuit comprises an additional output terminal emitting a tri-state signal that interrupts a flow of current through the primary winding,
    a secondary transmitter is arranged on the secondary side of the switched-mode power supply to switch a load on the secondary winding to a low impedance in accordance with the secondary information,
    a primary evaluation module is coupled to the primary winding to detect the secondary information, and
    wherein the flow of current through the primary winding is indicative of the energy transmission phase.

4. The arrangement according to claim 1, wherein the controllable switching device comprises a first buffer and a second buffer which operate similarly to electronic switches, the second buffer being an inverting buffer, wherein inputs of the first and second buffers are connected to a control output terminal of the control circuit, wherein an output of the first buffer is connected to a first end of the primary winding, wherein an output of the second buffer is connected to a second end of the primary winding, and wherein operating-voltage connections of the first and second buffers are connected to a direct voltage.

5. An arrangement for a galvanically isolated transmission of power and information to an electronic unit, comprising:
    a switched-mode power supply including:
        a rectifier element,
        a transformer with a primary winding and a secondary winding, wherein the secondary winding is connected to a first output terminal of the switched-mode power supply via the rectifier element, and to a second output terminal of the switched-mode power supply, and a controllable switching device having a control circuit which is connected to an information input terminal of the arrangement, the information input terminal receiving primary information to be transmitted to a secondary side of the switched-mode power supply, the control circuit actuating the controllable switching device in accordance with the primary information, wherein the primary winding and the controllable switching device are arranged in a series circuit which is connected between first and second input terminals of the arrangement;

an evaluation circuit which detects the primary information and which is coupled to a circuit point between the secondary winding and the rectifier element;

a transmitter coupled to the secondary side of the switched-mode power supply, the transmitter switching a load on the secondary winding to a low impedance in accordance with secondary information to be transmitted to a primary side of the switched-mode power supply when the controllable switching device is open; and an evaluation module which detects the secondary information and which is coupled to an end of the primary winding, wherein the switched-mode power supply includes a diode, and the transmitter includes a load impedance and a switching section of an electronic switch, the electronic switch being controlled in accordance with the secondary information, wherein the load impedance, the switching section and the diode form a series arrangement which is connected in parallel to the secondary winding.

6. An arrangement for a galvanically isolated transmission of power and information to an electronic unit, comprising:

a switched-mode power supply including:

a rectifier element, a transformer with a primary winding and a secondary winding, wherein the secondary winding is connected to a first output terminal of the switched-mode power supply via the rectifier element, and to a second output terminal of the switched-mode power supply, and a controllable switching device having a control circuit which is connected to an information input terminal of the arrangement, the information input terminal receiving primary information to be transmitted to a secondary side of the switched-mode power supply, the control circuit actuating the controllable switching device in accordance with the primary information, wherein the primary winding and the controllable switching device are arranged in a series circuit which is connected between first and second input terminals of the arrangement;

an evaluation circuit which detects the primary information and which is coupled to a circuit point between the secondary winding and the rectifier element;

a transmitter coupled to the secondary side of the switched-mode power supply, the transmitter switching a load on the secondary winding to a low impedance in accordance with secondary information to be transmitted to a primary side of the switched-mode power supply when the controllable switching device is open; and an evaluation module which detects the secondary information and which is coupled to an end of the primary winding, wherein the evaluation circuit includes a first comparator element, and the evaluation module includes a second comparator element, each of the first and second comparator elements generating a digital signal with one sign when one incoming-voltage level is exceeded and a digital signal of another sign when a lower incoming-voltage level is not exceeded.

7. An arrangement for a galvanically isolated transmission of power and information to an electronic unit, comprising:

a switched-mode power supply including:

a rectifier element, a transformer with a primary winding and a secondary winding, wherein the secondary winding is connected to a first output terminal of the switched-mode power supply via the rectifier element, and to a second output terminal of the switched-mode power supply, and a controllable switching device having a control circuit which is connected to an information input terminal of the arrangement, the information input terminal receiving primary information to be transmitted to a secondary side of the switched-mode power supply, the control circuit actuating the controllable switching device in accordance with the primary information, wherein the primary winding and the controllable switching device are arranged in a series circuit which is connected between first and second input terminals of the arrangement;

an evaluation circuit which detects the primary information and which is coupled to a circuit point between the secondary winding and the rectifier element;

a transmitter coupled to the secondary side of the switched-mode power supply, the transmitter switching a load on the secondary winding to a low impedance in accordance with secondary information to be transmitted to a primary side of the switched-mode power supply when the controllable switching device is open; and an evaluation module which detects the secondary information and which is coupled to an end of the primary winding, wherein the primary evaluation module includes a logic circuit having a first input coupled to the primary winding, a second input coupled to a control output terminal of the control circuit, and a third input coupled to the tri-state signal.

8. An arrangement for a galvanically isolated transmission of power and information to an electronic unit, comprising:

a switched-mode power supply including:

a rectifier element, a transformer with a primary winding and a secondary winding, wherein the secondary winding is connected to a first output terminal of the switched-mode power supply via the rectifier element, and to a second output terminal of the switched-mode power supply, and a controllable switching device having a control circuit which is connected to an information input terminal of the arrangement, the information input terminal receiving primary information to be transmitted to a secondary side of the switched-mode power supply, the control circuit actuating the controllable switching device in accordance with the primary information, wherein the primary winding and the controllable switching device are arranged in a series circuit which is connected between first and second input terminals of the arrangement;

an evaluation circuit which detects the primary information and which is coupled to a circuit point between the secondary winding and the rectifier element;

a transmitter coupled to the secondary side of the switched-mode power supply, the transmitter switching a load on the secondary winding to a low impedance in accordance with secondary information to be transmitted to a primary side of the switched-mode power supply when the controllable switching device is open; and an evaluation module which detects the secondary information and which is coupled to an end of the primary winding, wherein the secondary transmitter includes an electronic switching mechanism which includes a switching section arranged in parallel with the rectifier element, and wherein the evaluation circuit includes a comparator having a predetermined threshold.

* * * * *